Figure 3:
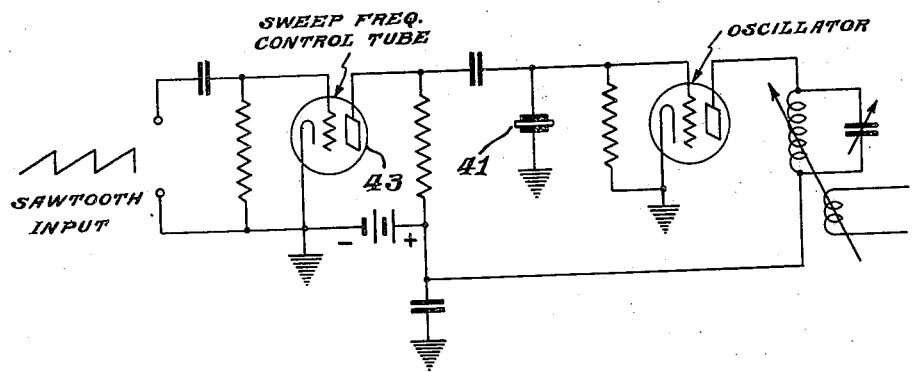

July 8, 1947.  J. EVANS  2,423,644
RANGE FINDER
Filed May 19, 1939  2 Sheets-Sheet 1
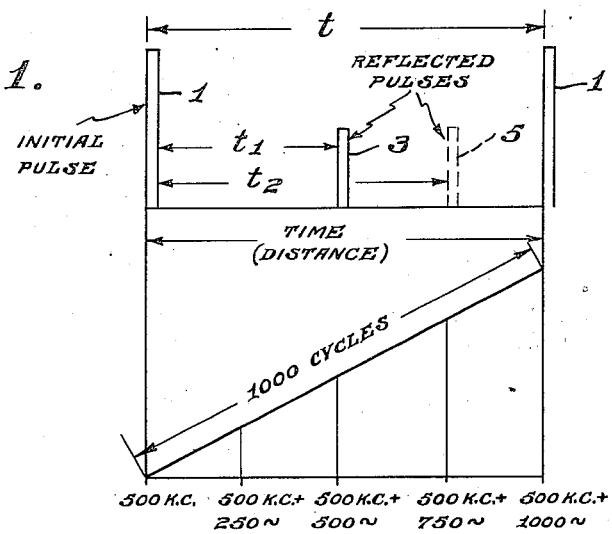
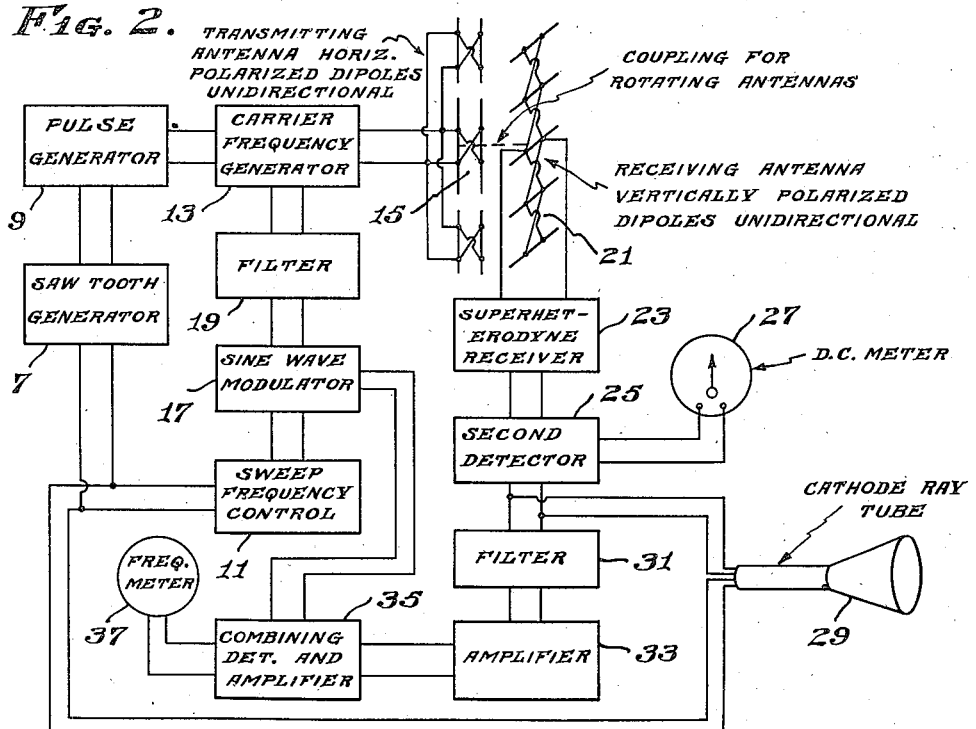
Inventor
John Evans
By
Attorney Patented July 8, 1947

2,423,644

UNITED STATES PATENT OFFICE 2,423,644

RANGE FINDER

John Evans, Palmyra, N. J., assignor to Radio Corporation of America, a corporation of Delaware Application May 19, 1939, Serial No. 274,641

10 Claims. (Cl. 250—1.66)

This invention relates to ranging or distance measuring apparatus and to the method of ranging or measuring distances. More particularly, the invention relates to an echo system and method in which modulated pulses are transmitted toward a reflecting medium and, after reflection, are received, demodulated and the frequency of the demodulated pulses compared with a sweep frequency to indicate range or distance.

Distances have been indicated by transmitting a pulse and by observing the time required for the transmitted pulse to travel to a reflecting object and back to the receiver. The distances have been indicated by an oscillograph indicator which is operated at a known sweep rate in synchronism with the pulse transmitter. In another system a carrier is modulated throughout a range of frequencies and transmitted toward a reflecting object. The carrier received after reflection is combined with the then transmitted carrier to form beat frequency currents. The frequency of the beat indicates the elapsed time or distance to the object.

The pulse system has the disadvantage of having an oscillograph which is sometimes difficult to read and very fatiguing to an operator required to take observations over an extended period. Furthermore, the oscillograph does not lend itself readily to an alarm signal, which is desirable for indicating obstacles. The frequency system overcomes the objections to the oscillograph indicators but has the marked disadvantages that the continuously transmitted carrier tends to overload or block the receiver for reflected signals of low intensity. Neither of the foregoing systems lend themselves readily to a narrow frequency band receiver, which contributes markedly to increasing the ratio of signal to noise.

The present invention has for one of its objects the provision of means for transmitting a modulated pulse, and for indicating the reflected modulated pulse as a function of range or distance. Another object is to provide means for radiating a modulated pulse, and for varying a reference or sweep frequency which is combined with the reflected pulse to derive a beat frequency signal. An additional object is to provide means for transmitting a pulse wave which is modulated by a selected portion of a frequency sweep signal, and for indicating the frequency of the beat formed by combining the demodulated component of the reflected pulse wave with the frequency sweep signal. A further object lies in the method of measuring distance by transmitting a modulated pulse, by combining the demodulated component of the pulse after reflection with a sweep frequency and measuring the frequency of the combined component and sweep to thereby indicate distance.

Figure 4:
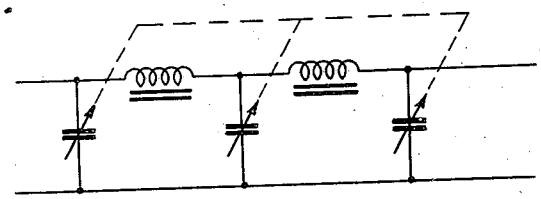

The invention will be described by referring to the accompanying drawing in which Figure 1 is a graph descriptive of the operation of the invention; Figure 2 is a schematic diagram of an embodiment of the invention; Figure 3 is a schematic circuit diagram of an embodiment of the frequency sweep and modulator; and Figure 4 is a diagram of a filter employed in the invention.

Referring to Fig. 1, initial pulses 1 of radio energy of carrier frequency are transmitted at suitable intervals $t$. These pulses are modulated by a radio signal of a frequency of 500 kilocycles per second, by way of example. During the interval $t$ the modulation frequency increases 1000 cycles, or from 500 to 501 kilocycles per second. The rate of change is preferably linear although a hyperbolical sweep may be used. The transmitted pulses after reflections are received as pulses 3, 5. The first received reflected pulse 3 idicates that the wave has travelled a shorter distance than the second 5. During the intervals $t_1$ and $t_2$, which are respectively the intervals between the initial pulse and the first and second reflected pulses 3, 5, the modulator frequency has changed to 500.5 and 500.75 kilocycles per second, respectively. If the audio components of the reflected pulses are derived by combining the currents of the modulator and the currents of the reflected pulses to form beats, the frequencies of the beats will correspond to time elapsing between transmission and reception. Since the velocity of radio waves is known, the time or frequency scale may be calibrated in terms of range or distance.

One embodiment of apparatus suitable for carrying out the steps of the foregoing method is shown in Fig. 2. In this circuit, a sawtooth wave generator 7 is connected to a pulse generator 9 and to a sweep frequency control circuit 11. The pulse generator is connected to a carrier frequency generator 13 which is suitably coupled to a directive antenna 15. The antenna 15 is preferably horizontally polarized. The sweep frequency control circuit 11 is joined to the sine wave modulator 17 which is connected through a filter 19 to the carrier frequency generator 13.

The receiver includes a directive antenna 21. This antenna is preferably vertically polarized and is coupled mechanically to the transmitting antenna 15 so that the two antennas may be rotated in all directions by a common control. The horizontal polarization of the transmitting antenna and the vertical polarization of the receiving antenna diminishes the direct pickup without apparent diminution of reception of the reflected pulses which appear to be polarized in random directions. The receiving antenna is connected to a radio receiver, preferably of the superheterodyne type 23. The second detector 25 of the receiver may include a D.-C. meter 27 and a cathode ray tube 29. The output of the second detector is applied through a filter 31 to an amplifier 33. The amplifier output and currents from the sine wave modulator are combined in a combining detector 35 which may include an amplifier. The output of the combining detector 35 is connected to a frequency meter 37.

The operation of the system is as follows: The carrier currents are modulated continuously by the sine wave modulator. The frequency of modulation is swept through a range of 500 to 501 kilocycles per second. This sweep is in synchronism with the saw-tooth currents. The saw-tooth currents are converted into pulses which key the carrier frequency generator. The keying pulses are applied so that the modulated carrier is only radiated during the successive pulses from the pulse generator, and so that the radiation includes only the beginning portion of the modulation sweep i. e., the 500 kilocycle frequency. At the time a reflected pulse is received the modulator will have changed its frequency to a different frequency. Currents of the difference frequency will appear in the combining detector in accordance with the well known beat phenomenon. The frequency of the beat is indicated on a direct reading meter which may be calibrated in any desired units of distance, time, or frequency.

The direct current indicator 27 is used to indicate the amplitude of the rectified pulses. When observed as a function of distance the amplitude of the reflected pulses is an approximate indication of the size of the reflecting body. The D.-C. meter 27 is also useful in aligning the directive antennas on the reflecting object to indicate its angular position in the azimuth and zenith. Since the frequency meter 37 will only indicate a single frequency, the cathode ray tube indications are helpful to differentiate multiple reflections. When multiple reflections are observed, either or both filters 19, 31 may be adjusted to attenuate currents of the undesired frequencies. The second filter 31 is arranged to pass currents of the frequency corresponding to the desired reflection.

In the practical application of the invention, no detailed description of the pulse generator, saw-tooth generator, carrier frequency generator, superheterodyne receiver, second detector, amplifier, combining detector and frequency meter is necessary as these elements are well known to those skilled in the art. The sweep frequency control circuit and sine wave modulator circuit are shown in Fig. 3. The piezo-electric crystal 41 provides a substantially constant frequency oscillator for generating a sine wave current. The sweep frequency control tube 43 has applied to its input circuit a potential of saw-tooth wave form which causes the output impedance to vary as a function of the sweep. The variable impedance shifts the frequency of the oscillator as previously described. One suitable type of filter is shown in Fig. 4. The elements are adjusted by a single control so that the filter may be readily tuned to the desired band of frequencies.

It should be understood that the method is not limited to any particular circuit elements, and that the frequencies mentioned are chosen by way of illustration rather than limitation. In practice, the frequencies are selected with respect to the distances to be measured. In general, the shorter the range the higher the frequencies, and the shorter the pulses. The several frequencies and their ratios may be varied to make it difficult to detect the device during warfare. One of the applications of the device is for range finding; another use is in obstacle detection.

I claim as my invention:

1. In a device of the character described, means for radiating a pulse of wave energy, means for generating a modulating signal, means for varying the frequency of said modulating signal at a known rate, means for applying a portion of known frequency of said signal to modulate said pulse, means for receiving said modulated pulse after reflection, means for combining said modulation signal and said reflected signal to obtain a signal corresponding to their difference frequency, and means for indicating the difference frequency of said modulating signal at the time of reception and the frequency of modulation of said received pulse.

2. In a distance measuring apparatus, means for directively radiating a pulse of wave energy, a modulation source, means for varying the frequency of said source over a known band at a known rate, means for applying said varied modulation to said pulse so that said pulse is modulated at a known frequency, a receiver for receiving said pulse after reflection, and means for indicating the frequency of the modulation source at the moment of said reception.

3. In a device of the character of claim 1, means for eliminating pulses reflected from objects whose distances are not to be determined.

4. In a device of the character of claim 2, a filter for attenuating currents corresponding to undesired reflections.

5. A distance measuring apparatus according to claim 2 and including means for combining the currents corresponding to the modulation component of a reflected pulse and corresponding to the modulation source at the moment of said reception, and an indicator connected to said combining means for indicating the difference frequency of said combined currents.

6. The method of radio range finding which includes radiating a discrete pulse of wave energy followed by an interval at least several times longer than the duration of said pulse, producing a current simultaneously with said radiation, varying the frequency of said current as a function of time, receiving said pulse after reflection from an object whose range is to be determined, and indicating the moment of said reception as a function of the frequency of said varying frequency current so that said range may be determined thereby.

7. The method of radio range finding which includes producing a current of varying frequency, producing a pulse of wave energy, modulating said pulse wave energy with a portion of said varying current of a known frequency, radiating said modulated pulse, receiving said pulse after reflection, and indicating the frequency of said current of varying frequency at the moment of reception of said reflected pulse.

8. The method of radio range finding which includes producing a current of varying frequency, producing a pulse of wave energy, modulating said pulse with a current of known frequency, radiating said modulated pulse, synchronizing the radiation of said pulse with the production of said current of varying frequency, receiving said modulated pulse after reflection, demodulating said received reflected pulse, mixing the current of varying frequency with the demodulated pulse, and indicating the resulting frequency to thereby indicate the range of said reflection.

9. The method of radio range finding which includes producing a current of varying frequency, producing a pulse of wave energy, modulating said pulse with a current of known frequency, radiating directively said modulated pulse, synchronizing said radiation with the production of said current of varying frequency, receiving said modulated pulse after reflection, demodulating said received reflected pulse, mixing the current of varying frequency with the demodulated pulse, and indicating the resulting difference frequency to thereby indicate the range of said reflection.

10. The method of claim 8 including an additional step of attenutating currents corresponding to reflections from objects other than the object whose range is to be determined.

JOHN EVANS.

REFERENCES CITED

The following references are of record in the file of this patent:

UNITED STATES PATENTS

| Number | Name | Date |
| --- | --- | --- |
| 2,011,392 | Bentley | Aug. 13, 1935 |

OTHER REFERENCES

Bell Telephone System Technical Publications (Radio, Monograph B-1124). Article, "A Terrain Clearance Indicator," by Espenschied and Newhouse.